(12) United States Patent
Xie (10) Patent No.: US 8,875,437 B1
(45) Date of Patent: Nov. 4, 2014

(54) ELECTRIC-SHOCK PEST KILLING APPARATUS WITH AUTOMATIC PEST BODY CLEANUP

(71) Applicant: Zhilong Xie, Jingzhou (CN)

(72) Inventor: Zhilong Xie, Jingzhou (CN)

( * ) Notice: Subject to any disclaimer, the term of this patent is extended or adjusted under 35 U.S.C. 154(b) by 232 days.

(21) Appl. No.: 13/656,473

(22) Filed: Oct. 19, 2012

(51) Int. Cl.
*A01M 1/22* (2006.01)
*A01M 1/04* (2006.01)

(52) U.S. Cl.
USPC .............................................. 43/112; 43/113

(58) Field of Classification Search
USPC ...................................... 43/98, 107, 112, 113
See application file for complete search history.

(56) References Cited

U.S. PATENT DOCUMENTS

| | | | | |
|---|---|---|---|---|
| 5,595,018 A | * | 1/1997 | Wilbanks | 43/112 |
| 6,055,766 A | * | 5/2000 | Nolen et al. | 43/112 |
| 6,134,826 A | * | 10/2000 | Mah | 43/112 |
| 2007/0011940 A1 | * | 1/2007 | Chen et al. | 43/113 |
| 2012/0180379 A1 | * | 7/2012 | Tien | 43/112 |

* cited by examiner

*Primary Examiner* — Christopher P Ellis
*Assistant Examiner* — Michael Wang (57) ABSTRACT

This present invention is a pest killing apparatus having a upper housing separated and supported from a base, cleanup unit, a lamp tube to lure pests, pest collection box, high voltage electric net and control circuit. The pest cleanup unit has an electric drive motor, brush support means and a brush. A vertical pest attraction lamp tube is an inert gas lamp tube or LED light-emitting diodes, reflective material, glass tube and the tube sockets. The lamp tube is located in a central axial or side vertical position between the upper housing and the base to induce insects toward the electric net. The upper housing is provided with attachments so that the apparatus can be suspended. The base is provided with a flat underside so the apparatus may be placed in operation on a horizontal surface.

15 Claims, 6 Drawing Sheets

ELECTRIC-SHOCK PEST KILLING APPARATUS WITH AUTOMATIC PEST BODY CLEANUP

FIELD OF THE INVENTION

This invention patent relates to a pest killing apparatus. It especially covers an electric-shock pest killing apparatus with automatic pest body cleanup. It is an apparatus to lure and kill insect pests, which can be widely used in the fields of agriculture, forestry, gardening, stockbreeding, urban and rural environmental sanitation and so on.

BACKGROUND OF THE INVENTION

Prior art flying pest killing apparatus are described in U.S. Pat. No. 3,123,933, 4,919,926, 5,657,576, 4,930,937, 3,986,292, and 4,523,404 and disclose various electrical discharge devices having certain defects described below.

The high voltage electric net or screen is easily to be blocked by adhered killed pests to cause short circuit of high voltage electric circuits. Thus the high voltage electric net or screen loses the ability to provide for pest killing. The prior art describes manual methods to clean up or remove pest bodies.

The rectifier (electronic or mutual inductance) of the tube to lure pets is likely to be damaged due to the influence on voltage fluctuations resulting from short circuiting of insect bodies across charged screens.

SUMMARY OF THE INVENTION

The objects of this invention are to avoid the above mentioned defects by providing a novel structure, excellent insecticidal effect, and easy and convenient for automatic pest body cleanup. It is resistant to wind and rain. It is an electric-shock pest killing apparatus with automatic pest body cleanup and it is suitable for long-term use by hanging up in field or on ground.

The objective of this invention patent is achieved by the following technical scheme:

An electric-shock pest killing apparatus with automatic pest body cleanup comprises an upper housing enclosing a electrical drive mechanism and electrical circuits, including a control circuit, adapted to achieve the functions of circuit protection and electrical net or grid cleaning with deposit to a removable rigid container in a base of the apparatus. A fluorescent lamp is arranged at a central axis of the apparatus in order to attract flying pests to the electrical grip of the lamp. Vertical supports support and separate the upper housing from the base, which further supports one of three types of grid or net cleaning mechanisms with which to periodically or continuously remove from said grid or net insect bodies which provide short circuit connections between oppositely charged wires of arranged to engage and electrically kill flying pests.

A first invention method of cleaning insect bodies from the grid or net of oppositely charged wires generally vertically arranged between the upper housing and the base comprises providing a grid or net of oppositely charged adjacent vertical wires to form a charge plane upon which insects will land and be killed. For that plane of vertical wires, a horizontal plastic, non-conductive brush is fixed at each end to a chain or belt drive which causes bristles of the brush to abrade the wires of the grid or net and clean insect bodies from the wires. In a preferred embodiment, an electrical drive motor in the upper housing is connected to a common axle which drives two equal elevation grooved wheels that engage and support two vertically arranged chain loops which are further each engaged to an equal elevation grooved wheel so that turning on the drive motor causes the chain loops to rotate about the grooved wheels, whereby a horizontal brush is made to move up or down upon the vertical plane of wires to remove insect bodies. In a preferred method of operation, said brush is maintained at a highest elevated position and periodically brushes insect bodies downward to a collector box or container connected or engaged with the base. This is preferred since an upward brushing motion could result in lifting insect parts upward and occasionally having them fall onto the charged grid with needless discharge. Said drive motor is provided with limit switches whereby said brush is not lifted too high or low relative to an underside of the upper housing or an upper surface of the base. Electrical circuits and control microprocessors are located in the upper housing to accomplish charge/discharge operation for the grid and for moving the brush up and down the vertical wires as described above.

A second invention method of cleaning insect bodies from the grid or net of oppositely charged wires generally vertically arranged between the upper housing and the base comprises providing a grid or net of oppositely charged adjacent vertical wires to form a charge plane upon which insects will land and be killed. For that plane of vertical wires, a horizontal plastic, non-conductive brush is fixed at a central position to an a travel block of a rod type screw drive which causes bristles of the brush to move up and down to abrade the wires of the grid or net and clean insect bodies from the wires while maintaining the brush in a horizontal position similar to the first invention method just described. A rotating end of the rod type screw drive is set in the base to allow for free vertical rotation of the rod type screw drive and a topmost end is engaged to an electrical motor drive in the upper housing, whereby electrical circuits and limit switches or other means provide for up and down motion of the horizontal brush according to pre-set modes of operation similar to those of the first method just described above.

A third invention method of cleaning insect bodies from the grid or net of oppositely charged wires generally vertically cylindrically arranged between the upper housing and the base comprises providing a grid or net of oppositely charged adjacent vertical wires in a cylindrical form to form a cylindrical charge plane upon which insects will land and be killed. An axially located lamp draws insects to an outside surface of the cylindrical grid, where their bodies become lodged. A top support plate suspended below the upper housing is supported and rotatably driven by way of an electrical motor drive in the upper housing to which an upper edge of the cylindrical grid is fixed and electrically connected with electrical circuits in the upper housing. A bottom support plate is rotatably supported above an upper surface of the base, to which is fixed a lower edge of the cylindrical grid is fixed, whereby the entire assembly of the top support plate, cylindrical grid, and bottom support plate in general form a closed ended cylinder and rotate about a vertical axis of the apparatus. A vertical plastic or non-conductive brush is fixed to a vertical outer support separating the upper housing from the base, where the bristles are directed into continuous contact with a vertical line of a part of the outside surface of the cylindrical grid. When the entire assembly of the top support plate, cylindrical grid, and bottom support plate rotates, the brush removes insect bodies from the grid. In a preferred embodiment of the invention, the entire assembly of the top support plate, cylindrical grid, and bottom support plate remains fixed and without rotation until discharge or short circuiting is detected in the grid, whereafter the entire assembly of the top support plate, cylindrical grid, and bottom support plate is rotated 360 degrees in one direction and then 360 degrees in an opposite direction to accomplish bi-direction brushing of the entire outside surface of the cylindrical grid.

The invention power supply circuits supported within and effectively connected with electrical power to the upper housing comprise a high frequency oscillating circuit comprising triodes, high frequency transformer, resistance, capacitance and diode output for conversion and amplification of alternating current at 120V or 220V to direct current at 500V to 50,000V or by transformed direct current input.

DETAILED DESCRIPTION OF THE INVENTION

The invention is now discussed with reference to the figures.

Figure 1:
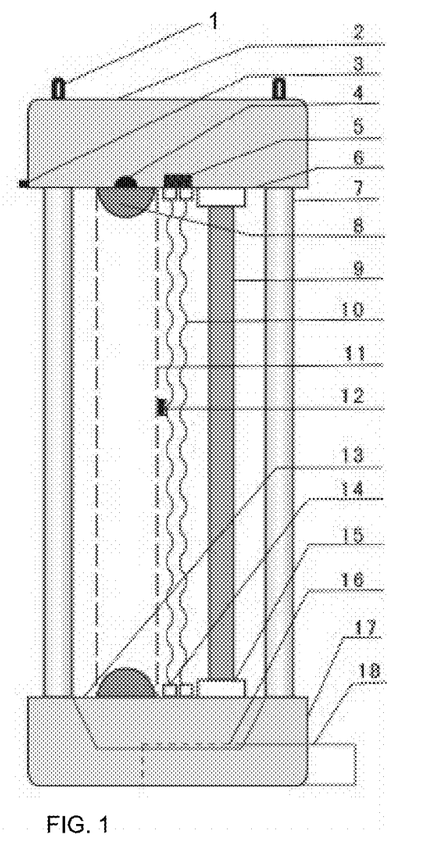
FIGS. 1 and 1a are respectively front and side views of a first type of the invention apparatus.
Figure 1A:
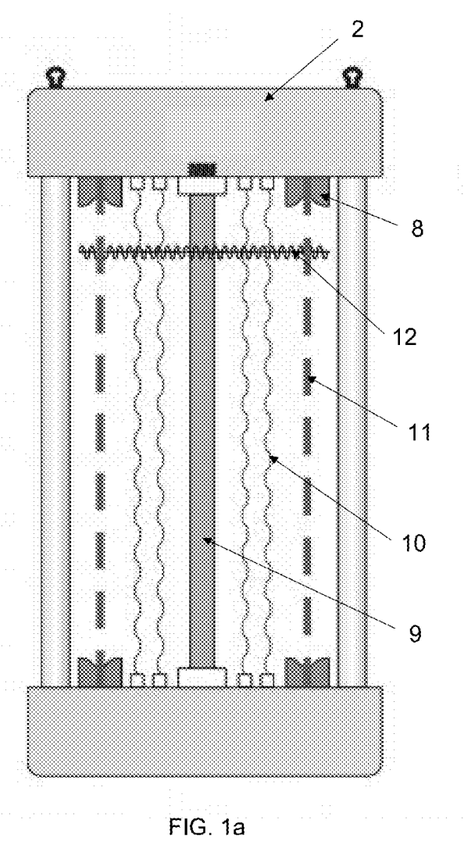

With reference to FIGS. 1 and 1a with respect to the first method of removing insect bodies from a charged grid or net, the invention apparatus of this embodiment comprises an upper housing 2, support for killing apparatus 7 supporting and vertically separating base 17 from upper housing 2, where a lamp tube to lure pests 9 and a high voltage electric net 10 (controlled by control circuit 5) are secured operatively between upper housing 2 and base 17. Base 17 comprises a pest collection box 18 which is adapted to receive brushed off pest bodies and to be withdrawn, drawer-style, for dumping out of accumulation therein. Lamp tube to lure pests 9 is composed of the inert gas lamp tube or LED light-emitting diodes, reflective material, glass tube and the tube socket components. High voltage electric net 10 is made of metal and oppositely charged adjacent wires and is arranged vertically or horizontally on insulation columns 14. The lamp tube to lure pests 9 is in the middle or by the side of high voltage electric net 10. Control circuit 5 is placed on supporting plate 6 comprising a lower plate of upper housing 2, it is set below the upper housing 2 and above the lamp tube 9. There is a pest gathering hole-joint 16 at the center of a bottom of the pest collection funnel plate. The pest collection box 18 connects to the hole-joint 16 by forming a drawer-shape type or screw-shape structure without the need of binding by rope.

In the process of manufacture, both the upper housing 2 and the pest collection funnel plate 17 are made of smooth-face plastic or metal material with yellowish or white and other colors. The appearance may be circular, square or rectangle. The spacing of the electric net 10 can be adjusted at will according to the kind of pests that to be killed. In one embodiment of the invention, the wavelength of the lamp tube 9 is in the range of 1 A to 6300 A angstrom for attraction of agriculturally significant pests.

Switch 3 is electrically connected with circuit 5 so that the apparatus can be turned on and off. Axle 4 is common to two grooved wheels 8 and is driven by an electric drive motor in upper housing 2 as described above, thereby causing rotation of wheels 8, chain loops 11 and grooved wheels rotatably fixed in base 17 so that horizontal brush 12 is moved up and down. Base 17 further comprises upper surface 13 and nut 1, which connects supports 7 to upper housing 2.

Figure 4:
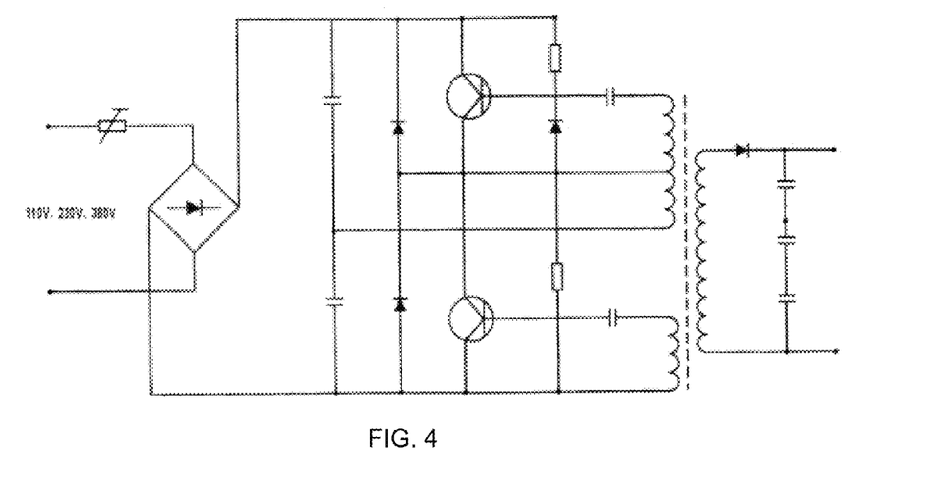
FIG. 4 is a schematic diagram of a high frequency oscillating high voltage circuit for providing protected and lethal charge to the invention apparatus grid or net.
Figure 5:
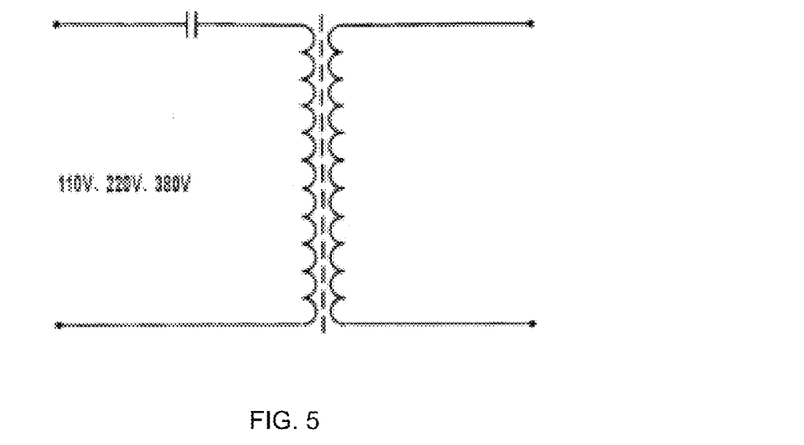
FIG. 5 is a schematic diagram of a mutual induction high voltage transformer for providing protected and lethal charge to the invention apparatus grid or net.

As disclosed in FIGS. 4 and 5, the high voltage section of control circuit 5 is composed of high frequency oscillating circuit or mutual induction voltage circuit. A high frequency oscillating circuit outputs 110V-220V direct current voltage converted by bridge rectification with diodes and capacitor filtering through 110V, 220V or 380V alternating current voltage. The direct current voltage will be added onto the triode. The high frequency oscillating circuit consists of triode, high frequency transformer, resistance, capacitance and diode. The oscillating signal is discharged by high frequency oscillating transformer and outputs alternating current high frequency voltage, then goes through the high voltage rectifying circuit, which is composed of diode and capacitance and get 500V-50000V DC high voltage power for the work of high voltage electric net.

High frequency oscillating circuit can also be consisted of high frequency oscillating transformer from 12V or other voltage direct current voltage DC inverter-fed inversion converter. High frequency high voltage is output through switch of high frequency high voltage transformer and then get direct current high voltage about 4000V to supply high voltage to high voltage electric net through high frequency high voltage rectifying and filtering.

Mutual induction circuits supply power source to voltage discharge transformer through accelerating board by means of 110V 220V or 380V alternating current voltage, the voltage is added to the primary winding set on the transformer and boosting the voltage. With the working principle of mutual induction, relevant alternating current voltage getting from the secondary winding set provides 500V-10000V alternating current high voltage with the current below 30 m A to supply high voltage for the work of high voltage electric net.

Figure 2:
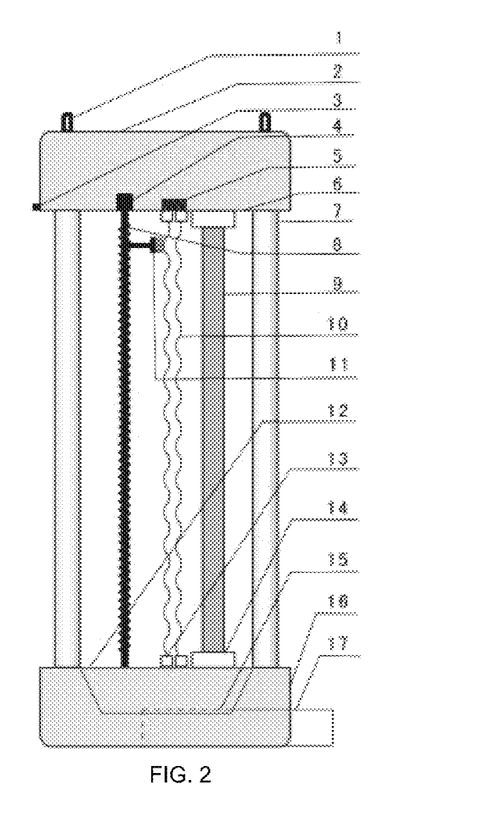
FIGS. 2 and 2a are respectively front and side views of a second type of the invention apparatus.
Figure 2A:
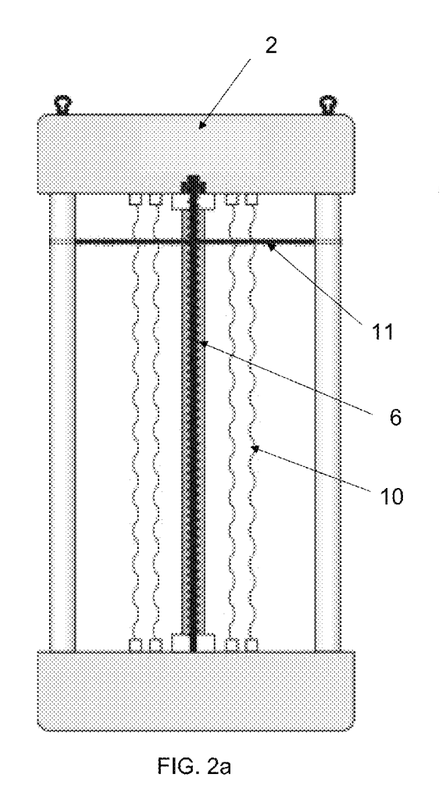

With reference to FIGS. 2 and 2a with respect to the second method of removing insect bodies from a charged grid or net, the invention apparatus of this embodiment comprises an upper housing 2, supports for killing apparatus 7 supporting and vertically separating base 16 from upper housing 2, where a lamp tube to lure pests 9 and a high voltage electric net 10 (controlled by control circuit 5) are secured operatively between upper housing 2 and base 16. Base 16 comprises a pest collection box 17 which is adapted to receive brushed off pest bodies and to be withdrawn, drawer-style, for dumping out of accumulation therein. Lamp tube to lure pests 9 is composed of the inert gas lamp tube or LED light-emitting diodes, reflective material, glass tube and the tube socket components. High voltage electric net 10 is made of metal and oppositely charged adjacent wires and is arranged vertically or horizontally on insulation columns 14. The lamp tube to lure pests 9 is in the middle or by the side of high voltage electric net 10. Control circuit 5 is placed on supporting plate 6 comprising a lower plate of upper housing 2, it is set below the upper housing 2 and above the lamp tube 9.

In the process of manufacture, both the upper housing 2 and a pest collection funnel plate are made of smooth-face plastic or metal material with yellowish or white and other colors. The appearance may be circular, square or rectangle.

The spacing of the electric net 10 can be adjusted at will according to the kind of pests that to be killed. In one embodiment of the invention, the wavelength of the lamp tube 9 is in the range of 1 A to 6300 A angstrom for attraction of agriculturally significant pests.

Switch 3 is electrically connected with circuit 5 so that the apparatus can be turned on and off. Top rotational connection 4 is effectively connected to vertically rotate a worm or rod type screw drive 8 and is driven by an electric drive motor in upper housing 2 as described above, thereby causing rotation of drive 8 so that horizontal brush 11 is moved up and down to remove insect bodies from grid 10. Base 16 further comprises upper surface 12 and nut 1, which connects supports 7 to upper housing 2.

Figure 3:
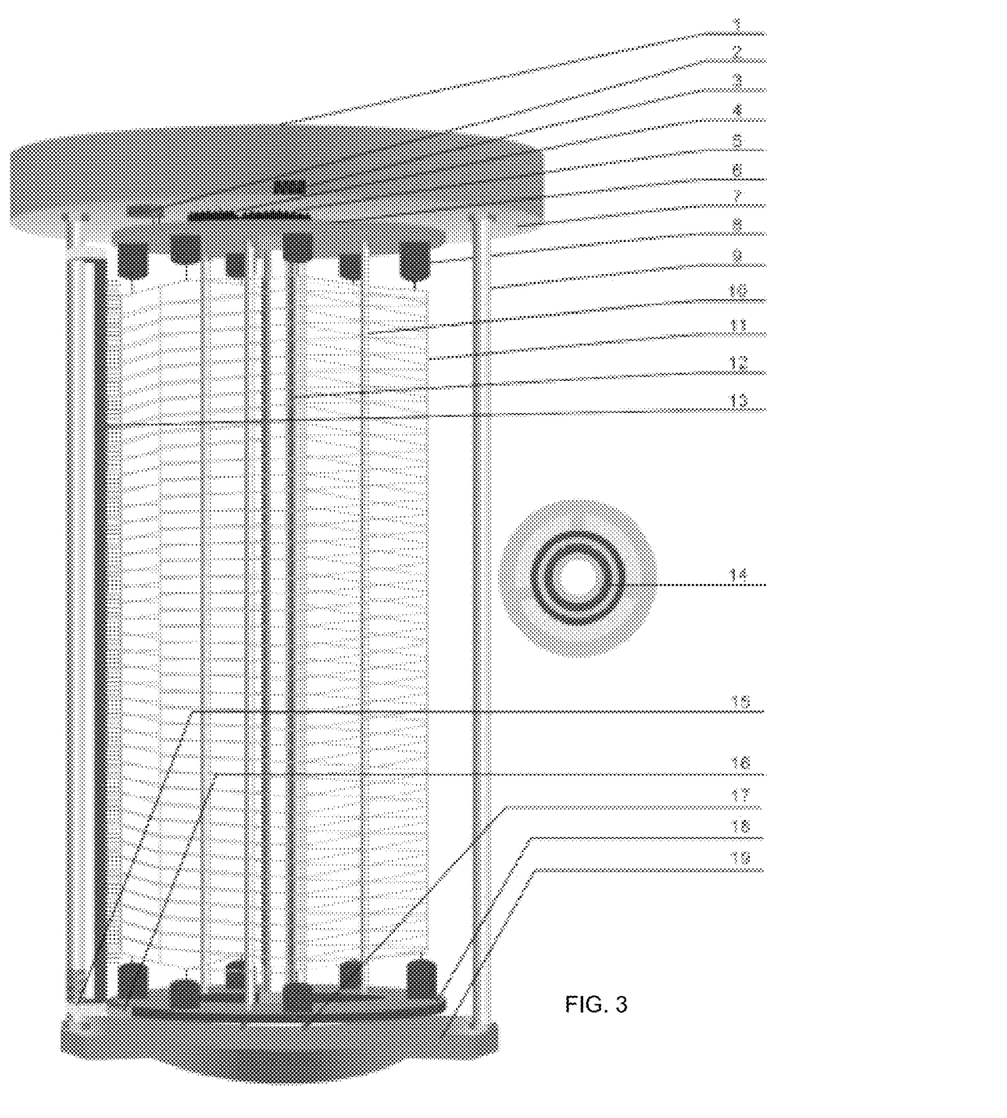
FIG. 3 is a side view of a fourth type of the invention apparatus.

With reference to FIG. 3 with respect to the third method of removing insect bodies from a charged grid or net, the invention apparatus of this embodiment comprises an electric drive motor 4 is within upper housing 1 to cause vertical axial rotation of upper rotating plate 6 suspended below underside plate 7 of housing 1, which is supported and separated from base 19 by supports 9. Lower rotation plate 18 is rotatably supported from base 19 by way of extensions 17 and is rigidly supported and separated from upper rotation plate 6 by supports 10, where each of plates 6 and 18 have tube openings radial from a vertical axis of the apparatus to allow passage therethrough of tube 12, used to attract insect pests to an outside of net or grid 11 which is supported cylindrically between plates 6 and 18 by way of insulators 8 and electrically connected with control circuit 3 by way of brush connectors 2. A convex touch head 16 is set under the lower rotation plate 18 for high-voltage electric net 11. Gears 5 connect the drive motor in upper housing 1 to rotate upper rotation plate 6. An opening 14 is adapted to provide dropout of insects brushed from grid 11 to its interior. Brush 13 is a vertical and plastic or non-conductive brush fixed to one vertical support 15 between upper housing 1 and base 19.

Once using the patented invention of the electric-shock pest killing apparatus with automatic pest body cleanup, it should first be hung up or set on smooth ground. After connecting power source, the control circuit will start the inert gas lamp tube or LED lamp tube lighted and produce high frequency oscillating voltage or mutual induction voltage outputting to high voltage electric net, to attract insect pests, thus pests will be lured by special wave light and touch the electric net to be killed. The killed pest body will fall into the pest collection funnel plate by sweeping brush of pest body cleanup.

Figure 6:
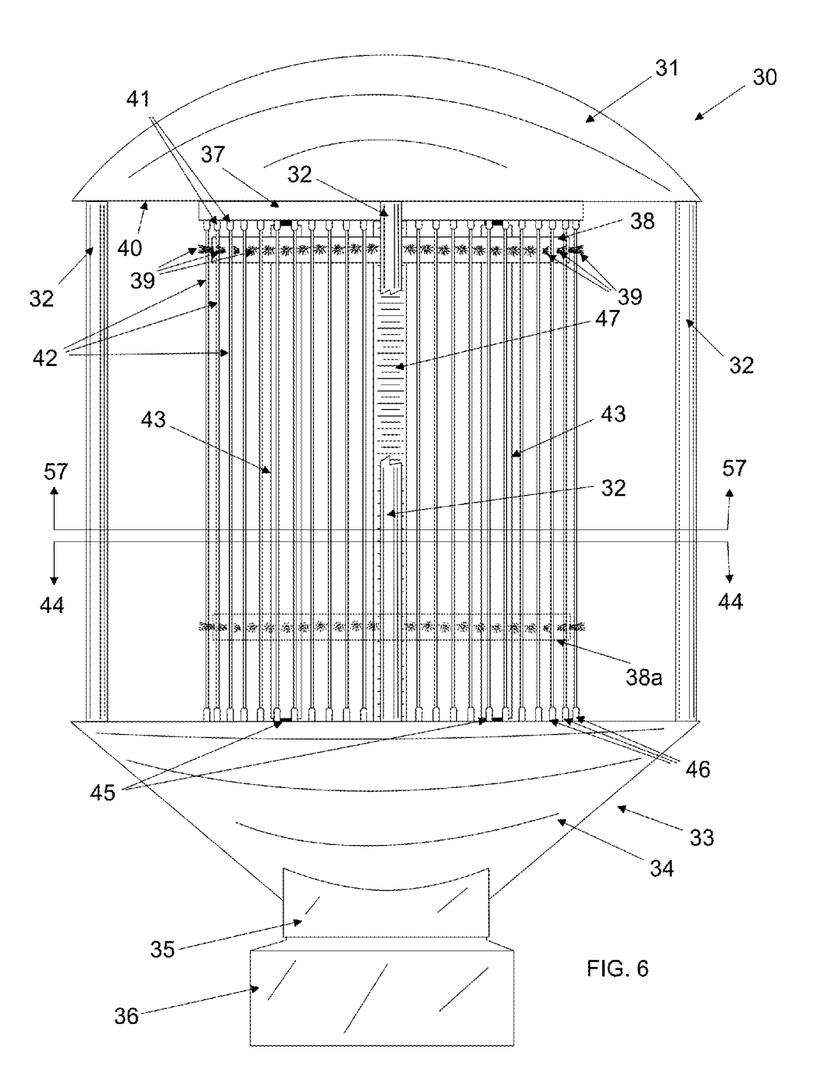
FIG. 6 is a side view of a third type of the invention apparatus.

FIG. 6 is a side view of a third type of the invention apparatus 30 having a top shell assembly 31 comprising a concave shell defining a cavity closed off by plate 40, said cavity enclosing a drive motor, switches, microprocessors and other electrical circuits and connections to accomplish the objects of the invention in a manner similar to that described above for other types of the invention. Assembly 31 is supported from lower shell assembly 33 by four tube supports 32, whose hollow bores allow for passage of electrical wires from assembly 31 to assembly 33 for electrical connection of distal ends of neon light tubes 43. Assembly 31 is supported vertically and spaced apart by supports 32 from an upward facing opening of assembly 33 for receiving electrocuted insects onto an inside surface of lower shell 34, through adapter 35 and into slidably removable collector 36. Shell 34 is generally an upwardly facing oval bowl with steep sides so that insects falling into it from above shall tumble into a centrally located adapter bore in adapter 35, then into a slidably removable box 36 for collection of dead insects.

Again referring to FIG. 6, box 36 is easily removed from adapted 25 so dead insects can be dumped out from time to time. Charged wires 42 extend vertically between wire connector housing 37 and a lower floor support 53 (shown in FIG. 8), where wires 42 are spaced apart from about 0.25 to 0.75 inches, are secured to housing 37 and support 53 (shown in FIG. 8) by insulating ceramic ferrules 41 and 47 respectively, and further pass through a lower wall of housing 37 into an internal cavity, wherein alternate ends of wires 42 are connected to positive or negative polarity direct current and the other alternate ends of wires 42 are connected with the opposite polarity direct current. Direct current for wires 42 is supplied from the circuits shown and described in FIGS. 5 and 6, adapted to be controlled by a microprocessor operating with a control program through an input/output unit causing switches to cause wires 42 to receive direct current charging according to the objects of the invention. Such microprocessor, input/output unit, switches and circuits are supported from plate 40 and enclosed within assembly 31. Neon light tubes 43 are supported and electrically connected with connectors 45 supported from support 53 (shown in FIG. 8) and extend up to similar electrical connectors on a downward facing plate of housing 37, a generally horizontally aligned oval shaped extension from plate 40. Wires for providing electrical power for light tubes 43 extend down supports 32 from assembly 31, into assembly 33, and thereby reaching connectors 45, where top connectors at the underside of housing 37 are connected by wires extending down from assembly 31.

FIG. 6 shows a threaded central worm drive 47 extending from a rotatable end resting in and supported from a bore in support 53 (shown in FIG. 8) at a distal end up through a supporting opening in plate 40 to an electrical rotation motor supported within and enclosed within assembly 31 from an upward facing surface of plate 40. Said microprocessor control program directs this rotation motor to rotate clockwise or counterclockwise as required by the objects of the invention, where rotation of drive 47 causes generally oval brush support frame 38 to be moved vertically up or vertically down, causing horizontally extending brushes 39, which extend outward through every space defined between adjacent wires 42, to brush dead, electrocuted insects off those wires downwardly into assembly 33. Frame 38a is shown in broken lines to show a lower vertical position of frame 38 after having brushed such insects from wires 42. Said rotational motor is operated by the control program so that an upper level switch detects and informs said control program when frame 38 is in a topmost position and when, by way of a lower level switch, it is in a lowest position. Normally, frame 38 is maintained in the topmost position until an input to the control program detects a short circuit between adjacent wires 42 when tubes 43 are turned on, indicating that a dead insect had become lodged on wires 42, whereafter frame 38 is moved by drive 47 to a lowest position and returned to a topmost position causing brushes 39 to brush dead insects from wires 42. Alternately, frame 38 is moved from a topmost position to a lowest position periodically by operation of the rotation motor at periods ranging from one minute to one hour as input as preferences by a user by way of a user interface of switches or otherwise. As yet another operational mode, a user may select a combined mode in which, after detection of more than a predetermined number of short circuits of wires 42, the control program causes frame 38 to be moved up and down only at predetermined times to prevent continuous operation of the motor at times when insects are being heavily executed.

Figure 7:
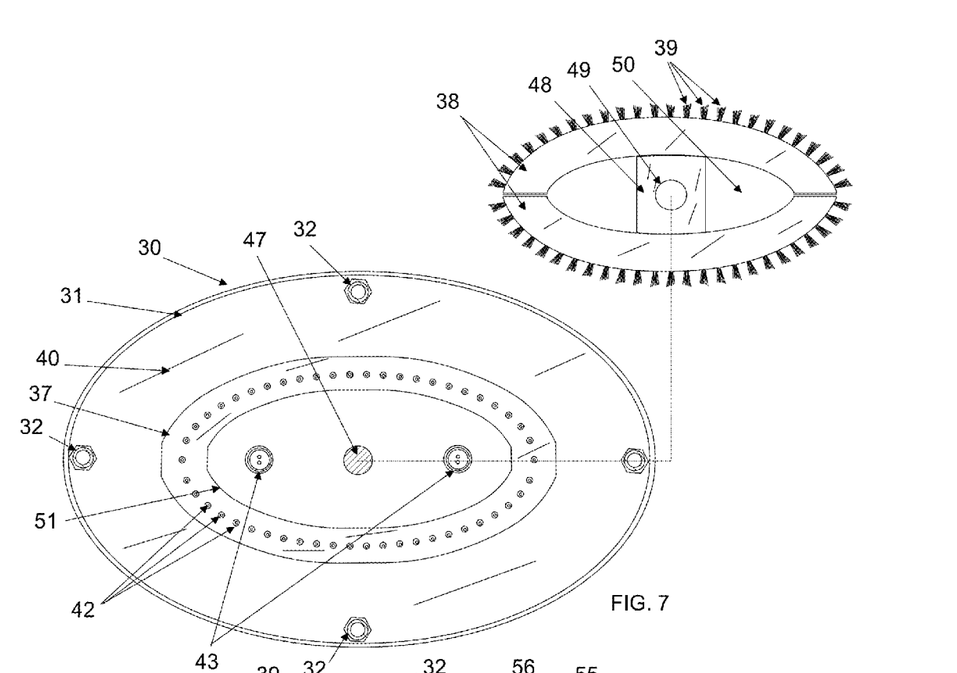
FIG. 7 is section 57 of FIG. 6 with a brushing structure moved aside.

Frame 38 comprises, as shown in FIG. 7, an outer, generally oval plate with plastic brushes 39 extending outward from embedment therein, with a central opening in the oval plate being spanned by plate 48 and having a threaded bore 49 adapted to be engaged by the threads of drive 47 to move frame 38 up and down according to the objects of the invention. Two portions 50 of the central opening defined in frame 38 remains open after location of plate 48 across a narrower width to provide for passage of frame 38 up and down without disturbing neon light tubes 43. FIG. 7 shows that generally oval housing 37 comprises an outer wall, a downward facing plate, and an inner wall 51, thereby defining an inner cavity and enclosing wired connections to upper ends of wires 42.

Figure 8:
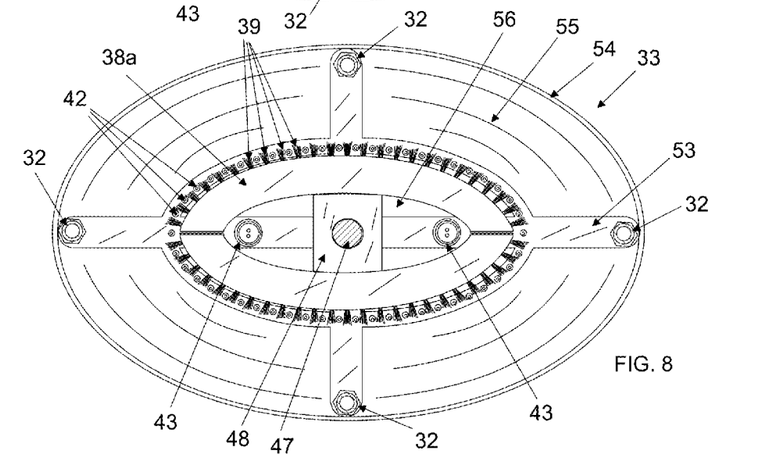
FIG. 8 is section 44 of FIG. 6.

FIG. 8 shows that support 53 comprises a generally "t" shape with arms horizontally extending from a central connection for receiving an end of drive 47 and outward along major and minor axes of the oval shape of shell 34, which has an inside surface 55 and rim 54. Support 53 further comprises a generally oval horizontal ring from which ferrules 45 are embedded for support of wires 42. A charging means of the invention comprises circuits shown in FIGS. 5 and 6 for achieving delivery of direct current voltage across alternating vertical wires 42 and immediate re-charging after short circuiting of said alternating wires when joined by an insect body.

The above design options will sometimes present the skilled designer with considerable and wide ranges from which to choose appropriate apparatus and method modifications for the above examples. However, the objects of the present invention will still be obtained by that skilled designer applying such design options in an appropriate manner.

I claim:

1. An electrical charge and discharge insect killing apparatus with neon tubes as light sources as an insect attractant comprising:
    (a) top shell assembly generally with an oval periphery and having a downward facing shell enclosed with a bottom plate supporting inside a microprocessor having a control program operating through an input/output unit a rotation drive motor, charging means for generating direct current for charging with opposite polarities vertical electrocution wires, and two neon light tubes;
    (b) a bottom shell assembly generally with an oval periphery and comprising an upward facing bottom shell vertically directed upward toward and spaced apart from the top shell assembly by four vertical support tubes secured at the oval a periphery of the top and bottom shell assemblies;
    (c) a support frame supported from an inside surface of the bottom shell having a generally oval wire support ring concentric with an upper periphery of the bottom shell and supporting therefrom distal ends of said vertical electrocution wires, each spaced apart from adjacent ones by a width of from 0.25 to 0.75 inches;
    (d) said vertical electrocution wires extending up toward the top shell assembly and secured from a lower housing generally oval in shape and extending down from the bottom plate, wherein said lower housing and said charging means electrically connect with proximal ends of the vertical electrocution wires, thereby defining a cagelike and generally oval vertical space between the top and bottom shell assemblies;
    (e) a threaded worm drive rotatably secured to rotate about at a central vertical axis of the top and bottom shell assemblies, extending from the support frame upward through a supporting opening in the bottom plate and connecting with the rotation drive motor for rotation thereby;
    (f) the two neon light tubes being electrically supported vertically between the top and bottom shell assemblies, a neon light tube located on either side of the worm drive inside said vertical space along a longest horizontal axis of said vertical space; and
    (g) a generally oval and horizontally maintained brush support frame having an outer periphery just smaller than said vertical space, wherefrom said outer periphery bristles of plastic brushes extend horizontally between each adjacent set of vertical electrocution wires, and the brush support frame is secured to the worm drive and adapted to be moved up and down.

2. The apparatus of claim 1 wherein the brush support frame is adapted to be maintained in a topmost position until a short circuit in the vertical electrocution wires is detected by the control program, whereafter the worm drive is operated to cause the brush support frame to move downward to a lowest position.

3. The apparatus of claim 2 wherein insect bodies are brushed from vertical electrocution wires.

4. The apparatus of claim 3 wherein said insect bodies fall to the bottom shell assembly to an inside surface of the bottom shell.

5. The apparatus of claim 4 wherein said insect bodies fall from the bottom shell into a removable collector connected with a lower end of the bottom shell, having a communicating opening thereto.

6. The apparatus of claim 2 wherein an upper limit switch provides input to the control program indicating that the brush support frame as reached a topmost position.

7. The apparatus of claim 6 wherein a lower limit switch provides input to the control program indicating that the brush support frame as reached a lowest position.

8. The apparatus of claim 7 wherein when the brush support frame is detected to have reached a lowest position that it immediately return to a topmost position.

9. The apparatus of claim 1 wherein the brush support frame is adapted to be maintained in a topmost position until a predetermined period of time has passed, whereafter the worm drive is operated to cause the brush support frame to move downward to a lowest position.

10. The apparatus of claim 9 wherein insect bodies are brushed from vertical electrocution wires.

11. The apparatus of claim 10 wherein said insect bodies fall to the bottom shell assembly to an inside surface of the bottom shell.

12. The apparatus of claim 11 wherein said insect bodies fall from the bottom shell into a removable collector connected with a lower end of the bottom shell, having a communicating opening thereto.

13. The apparatus of claim 9 wherein an upper limit switch provides input to the control program indicating that the brush support frame as reached a topmost position.

14. The apparatus of claim 13 wherein a lower limit switch provides input to the control program indicating that the brush support frame as reached a lowest position.

15. The apparatus of claim 14 wherein when the brush support frame is detected to have reached a lowest position that it immediately return to a topmost position.

* * * * *